(12) United States Patent
Laine et al.

(10) Patent No.: US 9,733,087 B2
(45) Date of Patent: Aug. 15, 2017

(54) ELECTRON-BOMBARDED ACTIVE PIXEL SENSOR STAR CAMERA

(71) Applicant: The Charles Stark Draper Laboratory, Inc., Cambridge, MA (US)

(72) Inventors: Juha-Pekka J. Laine, Boston, MA (US); Gregory Blasche, Burlington, MA (US); John J. Boyle, Bourne, MA (US); Paul Bohn, Brighton, MA (US); Robin M. Dawson, Watertown, MA (US); Benjamin F. Lane, Grafton, MA (US); Erik L. Waldron, Concord, MA (US); Stephen P. Smith, Acton, MA (US)

(73) Assignee: THE CHARLES STARK DRAPER LABORATORY, INC., Cambridge, MA (US)

( * ) Notice: Subject to any disclaimer, the term of this patent is extended or adjusted under 35 U.S.C. 154(b) by 474 days.

(21) Appl. No.: 14/211,308

(22) Filed: Mar. 14, 2014

(65) Prior Publication Data

US 2014/0267641 A1 Sep. 18, 2014

Related U.S. Application Data

(60) Provisional application No. 61/783,435, filed on Mar. 14, 2013, provisional application No. 61/783,660, (Continued)

(51) Int. Cl.
*G01C 1/04* (2006.01)
*H04N 5/30* (2006.01)
(Continued)

(52) U.S. Cl.
CPC .......... *G01C 21/025* (2013.01); *H01J 31/507* (2013.01); *H04N 5/30* (2013.01); *H04N 5/33* (2013.01)

(58) Field of Classification Search
CPC .................................................... G01C 21/025
See application file for complete search history.

(56) References Cited

U.S. PATENT DOCUMENTS

| | | | | |
|---|---|---|---|---|
| 3,372,266 A | * | 3/1968 | Chilton | G01S 3/7864 250/203.6 |
| 6,133,989 A | * | 10/2000 | Stettner | G01S 7/4816 250/332 |

(Continued)

OTHER PUBLICATIONS

Yadid-Pecht et al., CMOS Active Pixel Sensor Star Tracker with Regional Electronic Shutter, Feb. 1997, IEEE Journal of Solid-State Circuits, vol. 32, No. 2, pp. 285-288.*

(Continued)

*Primary Examiner* — David Porta
*Assistant Examiner* — Jeremy S Valentiner
(74) *Attorney, Agent, or Firm* — Nutter McClennen & Fish LLP; John J. Penny, Jr.

(57) ABSTRACT

A star camera system that includes an optical system configured to focus radiation from a star to be imaged onto a collector. Specifically, the collector is in the form of an electron bombarded active pixel sensor (EBAPS) configured to provide high gain. The EBAPS comprising a photocathode disposed in a vacuum is configured to release electron into a vacuum when exposed to radiation focused thereon by the optical system. In addition, the EBAPS includes an active pixel sensor anode disposed distant from the photocathode in the vacuum. An electric field is generated by a voltage source to direct electrons from the photocathode to the active pixel sensor anode to thereby generate an image of the star.

15 Claims, 5 Drawing Sheets

Related U.S. Application Data filed on Mar. 14, 2013, provisional application No. 61/783,804, filed on Mar. 14, 2013.

(51) Int. Cl.
  *G01C 21/02* (2006.01)
  *H04N 5/33* (2006.01)
  *H01J 31/50* (2006.01)

(56) References Cited

U.S. PATENT DOCUMENTS

| | | | |
|---|---|---|---|
| 6,285,018 B1* | 9/2001 | Aebi | H01J 31/26 |
| | | | 250/208.1 |
| 6,307,586 B1* | 10/2001 | Costello | H04N 5/238 |
| | | | 250/214 VT |
| 6,934,050 B2 | 8/2005 | Merrill et al. | |
| 2003/0202630 A1* | 10/2003 | Chen | A61B 1/042 |
| | | | 378/62 |
| 2004/0036788 A1* | 2/2004 | Chapman | H04N 5/3675 |
| | | | 348/308 |
| 2010/0283840 A1 | 11/2010 | Belenkii et al. | |
| 2010/0290047 A1 | 11/2010 | Halahmi | |
| 2011/0256655 A1* | 10/2011 | Nikzad | H01L 27/14643 |
| | | | 438/60 |
| 2012/0235036 A1 | 9/2012 | Hatakeyama et al. | |
| 2013/0082241 A1* | 4/2013 | Kub | H01L 27/148 |
| | | | 257/21 |
| 2014/0267641 A1 | 9/2014 | Laine et al. | |
| 2014/0267755 A1 | 9/2014 | Laine et al. | |
| 2015/0124103 A1 | 5/2015 | Dawson et al. | |

OTHER PUBLICATIONS

U.S. Appl. No. 14/211,210; Allowed claims as of Oct. 7, 2016 (7 pages).

* cited by examiner

ELECTRON-BOMBARDED ACTIVE PIXEL SENSOR STAR CAMERA

CROSS-REFERENCE TO RELATED APPLICATION

This application is based on and claims priority from Patent Application No. 61/783,804, filed on Mar. 14, 2013, Patent Application No. 61/783,660, filed on Mar. 14, 2013, and Patent Application No. 61/783,435, filed on Mar. 14, 2013, the disclosure of which is incorporated herein in its entirety by reference.

FIELD OF THE INVENTION

The present disclosure relates to devices and methods of capturing a star image for celestial navigation using an electron bombarded active pixel sensor.

BACKGROUND

In recent years telescope camera systems have been developed where the telescope consists of an optical system mounted to provide low friction rotation about two mutually perpendicular axes. The optical system is motor driven and permits adjustment of the telescope orientation, to prevent the star from appearing to be in continuous motion and drifting out of the field of view. In addition, the telescope camera systems include a camera with a shutter mechanism and image capturing material. Furthermore, no additional lens is needed in the camera because the telescope acts as the lens.

Conventional systems for star imaging use charge-coupled device imagers (CCD) or active pixel sensors as imaging sensors. CCD imagers usually have limited capacity due to size and weight as well as being susceptible to radiation damage. Furthermore, in a CCD device, an electrical charge is transferred from within the device to an area where the charge may be digitized. Specifically, the CCD imager includes a photoactive region (e.g., a silicon layer) and a transmission region. An image is projected through a lens onto a capacitor array (e.g., the photoactive region) causing each capacitor to accumulate an electric charge proportional to the light intensity. In addition, a control circuit causes each capacitor to transfer the electric charge to create a sequence of voltages which may be digitized and stored in a memory.

However, due to the sensitivity of the CCD imager, thermal noise and cosmic rays may alter the pixel in the CCD array, thereby causing shifts or hot spots in the imaging and degrading the star image. To avoid the disturbances caused by thermal noise, multiple exposures may be taken with the CCD shutter both closed and open which creates a baseline. For example, an average of the images taken with the shutter closed is taken to lower thermal noise and the average is subtracted from an open-shutter image to remove image defects.

Moreover, a CCD imager 100 has also been developed in connection with an image intensifier mounted in front of the CCD (ICCD) imager wherein photons are accelerated, as shown in FIG. 1. Specifically, photons hit a photocathode 105, thereby generating photoelectrons that are accelerated towards a micro-channel plate 115 by an electrical control voltage applied between the photocathode and the micro-channel plate. The photoelectrons are then accelerated toward a phosphor screen 110 that converts the photoelectrons back to photons that are guided to the CCD by the optical system. In addition, the amplifiers in the ICCD are mounted externally to increase the photon-generated charge above the read noise of the imager. Furthermore, the advantage of ICCDs is the gateability wherein the voltage between the photocathode and the micro-channel plate is reversed and the image intensifier may operate as a fast optical switch to collect more pixel charge.

In addition, an electron-bombarded semiconductor gain process has been developed using a photomultiplier tube that includes a photocathode, electrodes, and a collection anode having a semiconductor diode. Although the electron-bombarded CCD is not widely used as a detector for low light camera systems, the electron-bombarded semiconductor has been applied to the ICCD to prevent image degradation. Furthermore, to form the electron bombarded CCD, a back illuminated CCD has been used as an anode in focus with the photocathode. The backside illumination system includes a silicon wafer about 750 microns thick that contains a thin layer of light sensitive pixels on top of which several additional layers are placed to collect light emitted from an object such as a star. However, the electron-bombarded CCD exhibits limited gain adjustment range and similar to the ICCD, produces images having low resolution.

Alternatively, many star imagers apply a complementary metal-oxide-semiconductor (CMOS) imager to an active pixel sensor device. A CMOS imager uses a combination of p-type and n-type MOS field effect transistors to implement logic gates. A p-type transistor exists when a doped semiconductor contains excess holes and an n-type transistor exists when a doped semiconductor contains excess free electrons. In addition, the CMOS imager chip integrates amplifiers and analog to digital converters in the device thereby lowering the cost of a camera system to which the imager is applied. The CMOS imager may also integrate other functions such as timing logic, exposure control, shuttering, white balance, gain adjustment, and initial image processing algorithms.

Furthermore, each pixel in a CMOS imager chip contains conversion electronics that may read the accumulated charge as opposed to a whole charge being carried across the chip like the CCD imager. In other words, each pixel in the CMOS incorporates both the photodiode and a readout amplifier, wherein the charge accumulated by the photodiode may be converted into an amplified voltage inside the pixel and then transferred to the rows and columns of the chip. The structure of a CMOS imager allows for high noise immunity and low static power consumption since it does not rely on charge transfer, thereby preventing potential image shifts. Unlike the CCD imager, a CMOS imager only draws significant power while the transistors are switching on and off and thereby producing less waste heat.

Active pixel sensors are imaging sensors that include an amplifier in each pixel configured to increase the sensitivity of the sensor to light rays, such as light rays from a star. Thus, imaging of low light objects may be improved when an amplifier is added to the optical system as the field of view is made narrower and sensitivity of the sensor increases. Additionally, the star cameras applying active pixel sensors are generally smaller in size than a CCD imager that allows the sensor to contain more pixels, thereby improving the sensitivity of the sensor. FIG. 2 illustrates an exemplary view of an active pixel sensor device according to the prior art. As shown in FIG. 2, the active pixel sensor device includes an imager chip (the CMOS imager) 210 that includes an array of photodiodes 215 operating as optical pixels. Specifically, each unit pixel includes the photodiode in which electrons are generated by incident light.

Moreover, for star imaging, the number of electrons produced is a function of the wavelength and intensity of the light striking the semiconductor. Additionally, sensitivity is determined by the maximum charge that can be accumulated by the pixel and the ability of a device to accumulate the charge in a confined region without spillover. Thus, to observe stars outside a visible light spectrum, the sensitivity of a sensor must be adjusted as compared to the sensitivity required to observe stars in visible light.

Furthermore, low light imaging has recently become very important in observation of the universe as astronomers seek to further understand the development of stars and galaxies. In addition, star imaging has been challenging due to the universe emitting light across the electromagnetic spectrum, much of which does not reach the Earth. The atmosphere's ozone layer blocks out various types of radiation made up of a stream of photons including ultraviolet rays and far infrared rays while allowing most of the near infrared radiation to pass through. The various types of radiation of the electromagnetic spectrum varies according to the amount of energy that the photons contain. Furthermore, the atmosphere allows visible light, radio waves (containing the least energy), and certain wavelengths within the infrared region to reach the Earth. Thus, ground based observation stations may observe stars within the visible light spectrum which is within a wavelength region of about 390-700 nanometers. However, not all stars may be observed from the Earth because they are outside the visible wavelength spectrum. In addition, to observe the universe, astronomers have relied on space shuttles and satellites in Earth orbit having telescopes to gather information regarding photon energy that does not reach the Earth.

Many regions of light cannot be viewed from optical telescopes because the objects are embedded in dense regions of gas and dust. Additionally, stars are theorized to be formed from collapsing gas and dust clouds and, as the clouds collapse, the density and temperature of the cloud increases. A new star forms at the center of the cloud where the density and temperature are the greatest. Since the new star is embedded in the cloud of gas and dust, it is difficult to observe or image the star in visible light. Infrared radiation has the ability to pass through dusty regions of space without being scattered. Thus, stars hidden by gas and dust in the infrared region may be studied and imaged. Furthermore, infrared radiation is detected from objects that emit heat. The infrared radiation ranges from 1 to 300 micrometers in wavelength and much of the infrared radiation is absorbed by water vapor in the Earth's atmosphere. In addition, with infrared sensitivity sensors, stars that are still in the formation process may be observed because they emit infrared radiation before the star may be viewed in visible light.

Even though many stars may be considered substantially cool and emit much of their electromagnetic radiation in the visible spectrum, star observation and imaging may be improved by providing an imaging sensor sensitive to ultraviolet radiation between about 10-320 nanometers or shorter. Light at these wavelengths is absorbed by the Earth's atmosphere, therefore the observation must be performed from the upper atmosphere or from space. The ultraviolet spectrum consists of electromagnetic waves with frequencies higher than those that humans identify as the color violet. The photons also have higher energy than the photons in the visible light spectrum, thus the ultraviolet light has shorter wavelengths than that of the visible light. The higher energies of the ultraviolet spectrum are absorbed by the gases in the air and have a substantially short path length through the air. In addition, ultraviolet spectrum measurements are used to distinguish chemical compositions, densities, and temperatures of stars.

SUMMARY OF THE INVENTION

The present disclosure provides a system and method of capturing a star image using an electron bombarded active pixel sensor providing increased gain by electron multiplication. The star camera system includes an optical system configured to focus radiation from a star to be imaged onto a collector. The collector is a electron bombarded active pixel sensor (EBAPS) configured to provide high gain. The EBAPS includes a photocathode that is disposed in a vacuum and at or near the focal plane of the optical system. The EBAPS also includes an active pixel sensor anode that is disposed on an opposite end of the vacuum from the photocathode. Additionally, the EBAPS includes a voltage source that is connected to both the photocathode and the anode to provide an electric field within the vacuum between the photocathode and the anode. When the star is focused by the optical system onto the photocathode in the vacuum, the photocathode releases electrons into the vacuum and the electric field directs the electrons toward the active pixel sensor anode to generate a star image.

Furthermore, the method of capturing a star image includes projecting the star image onto a photocathode of an EBAPS that is disposed in a vacuum to release electrons into the vacuum. In addition, an active pixel sensor anode of the EBAPS is disposed at a distance from the photocathode within the vacuum. Furthermore, a voltage is generated between the photocathode and the anode by a voltage source to direct the electrons from the photocathode toward the anode to thereby output a signal from the active pixel sensor anode.

DESCRIPTION OF THE EXEMPLARY EMBODIMENTS

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the following detailed description, reference is made to the accompanying Figures, which form a part hereof. In the Figures, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. Additionally, particular aspects of each embodiment may also be used in conjunction with other embodiments of the present disclosure and thus, the disclosed embodiments may be combined as understood in the art. It will be readily understood that the aspects of the present disclosure, as generally described herein, and illustrated in the Figures, can be arranged, substituted, combined, separated, and designed in a wide variety of different configurations, all of which are explicitly contemplated herein. Further, in the following description, numerous details are set forth to further describe and explain one or more embodiments. While these details are helpful to explain one or more embodiments of the disclosure, those skilled in the art will understand that these specific details are not required to practice the embodiments.

The present invention provides a system and method for capturing a star image for orientation measurement, guidance and navigation correction, celestial navigation, or imaging. In particular, the system includes an optical system and a collector in the form of an electron bombarded active pixel sensor (EBAPS). The EBAPS includes a photocathode, an active pixel sensor anode, and a voltage source. The EBAPS of the present invention is capable of capturing low light level images due to the acceleration of electrons within the system and is capable of maintaining image quality in low light environments. The present invention may be applied from both satellites outside the Earth's atmosphere and to star observation and imaging performed from Earth.

Figure 1:
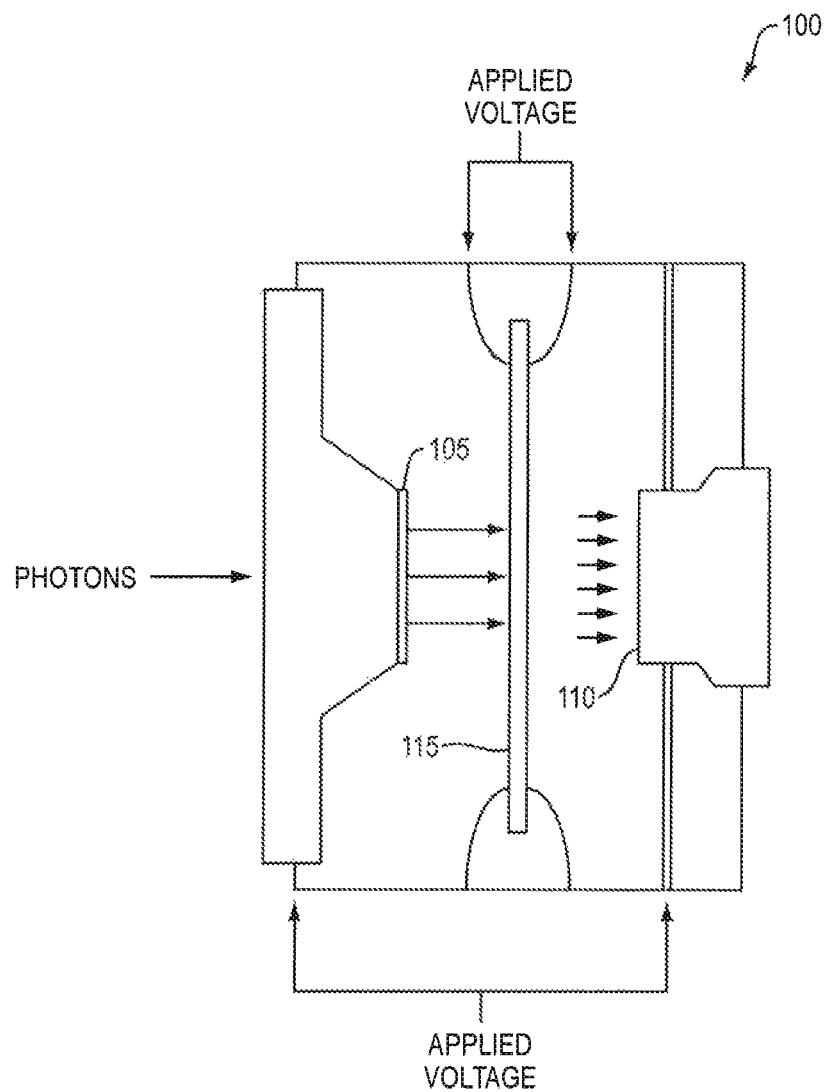
FIG. 1 is an exemplary schematic illustrating an intensified charge-coupled imager according to the prior art.
Figure 2:
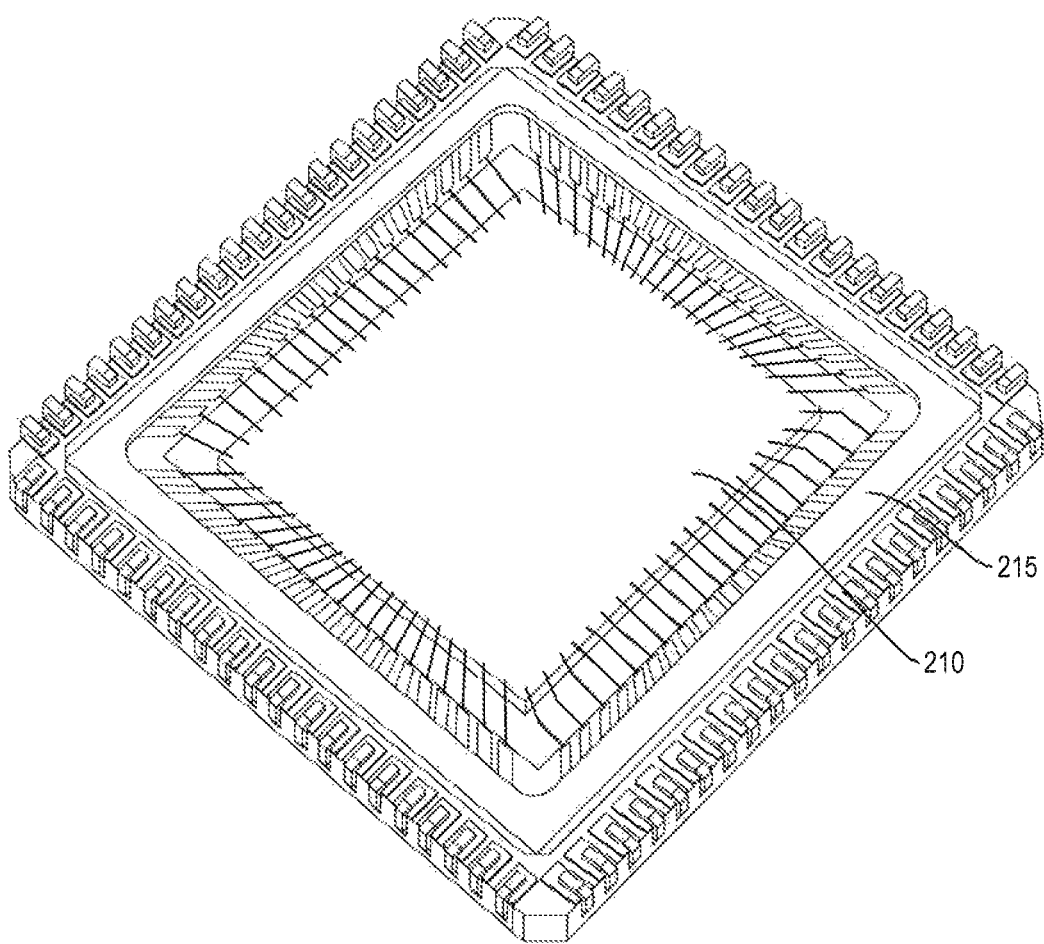
FIG. 2 illustrates an exemplary active pixel sensor device according to the prior art.
Figure 3:
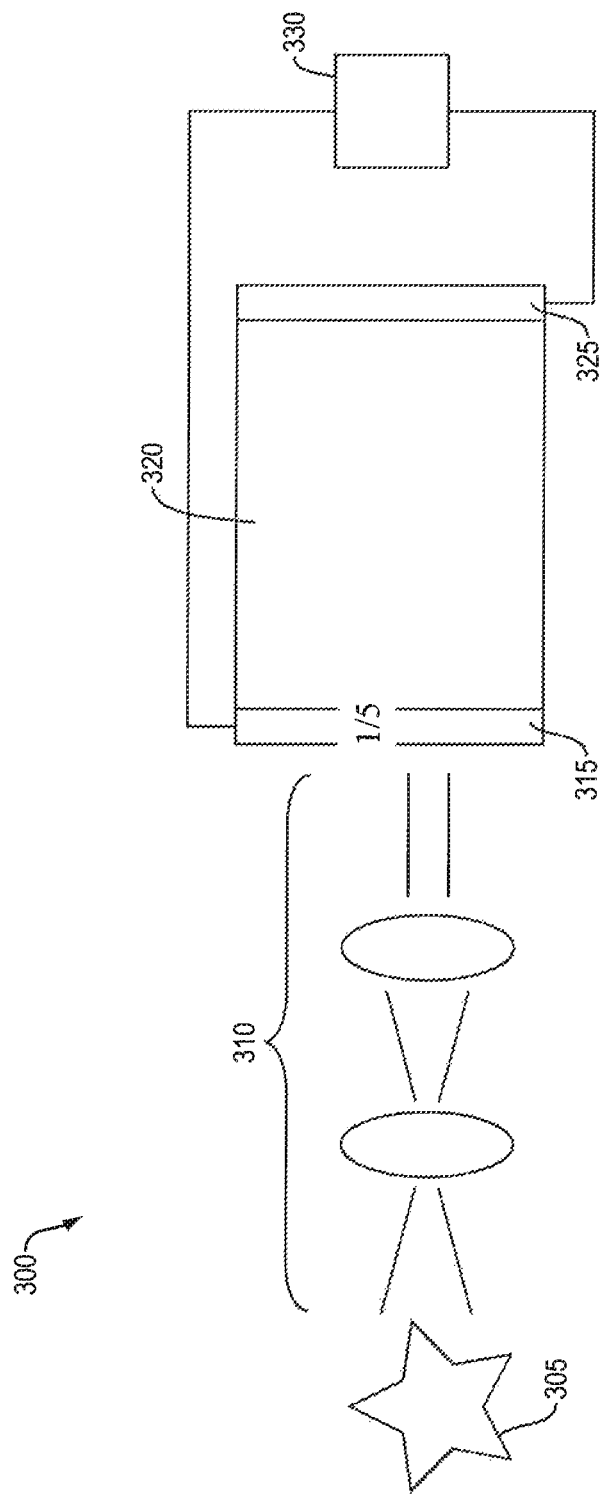
FIG. 3 illustrates an exemplary camera system according to an exemplary embodiment of the present disclosure.

As illustrated in FIG. 3, the star camera system 300 of the present invention includes an optical system 310 (e.g., a centro folded optical system) configured to focus radiation from a star 305 to be imaged onto a collector. Specifically, the present invention discloses a collector in the form of an EBAPS. The EBAPS includes a photocathode 315 disposed in a vacuum 320 and configured to release electrons into the vacuum 320 when exposed to radiation focused thereon by the optical system, wherein the optical system may be a plurality of lenses. Alternatively, the photocathode 315 may be disposed at a top part of the vacuum 320 such that a portion of the photocathode 315 is disposed outside of the vacuum 320. In addition, an active pixel sensor anode 325 may be disposed distant from the photocathode 315 within the vacuum 320. Furthermore, a voltage source 330 may be connected at one end to the photocathode 315 and at the other end to the active pixel sensor anode 325 to generate an electric field therebetween. The generation of the electric field between the photocathode 315 and the active pixel sensor anode 325 causes the electrons to move from the photocathode 315 toward the active pixel sensor anode 325 to thereby generate an image of the star 305. The voltage source 330 need not be directly connected to both the photocathode 315 and the active pixel sensor anode 325 as long as an electric field is created by the voltage source 330 between the photocathode 315 and the active pixel sensor anode 325.

In another embodiment of the present disclosure, the photocathode 315 may comprise a material such as gallium nitride that is sensitive to ultraviolet radiation from a star to capture images of stars 305 outside of the visible light spectrum. Alternatively, the photocathode 315 may comprise a layer of another material such as silicon germanium that is sensitive to infrared radiation from a star. The photocathode 315 may either be manufactured out of gallium nitride and/or silicon germanium, or may be constructed on a substrate that comprises gallium nitride and/or silicon germanium. It should be understood that the invention is not limited to one method of coating or preparing the photocathode 315. Moreover, the additional selection of a material for the photocathode 315 allows a star 305 to be imaged through the gas and dust clouds in the Earth's atmosphere. Furthermore, the infrared and ultraviolet sensitive materials may alternatively be added to the entire optical system to filter the various radiations emitted from the stars.

In yet another embodiment, the EBAPS may be configured to detect the radiation from at least two stars focused thereon by the optical system. Specifically, the infrared sensitive photocathode 315 disposed in the vacuum 320 is configured to release electrons into the vacuum 320 when exposed to the infrared radiation focused thereby on by the optical system. In addition, the active pixel sensor anode 325 is disposed distant from the infrared sensitive photocathode 315 in the vacuum 320 and the voltage source 330 is configured to generate an electric field between the infrared sensitive photocathode 315 and the active pixel sensor anode 325. Thus, the electrons are directed from the infrared sensitive photocathode 315 to the active pixel sensor anode 325 to thereby form an electron image of the two stars on the active pixel sensor anode 325. This embodiment allows multiple images of multiple stars to be captured simultaneously.

Furthermore, to increase the image resolution of the star image, the collector may be mounted on the translation device and moved relative to the optical system (e.g., a centro folded optical system) by a predetermined amount of less than pixel size in the focal plane of the optical system. Thus, multiple images of the same star may be captured at different relative positions. In particular, each pixel is smaller such that a greater number of pixels exist in one area, thus increasing the image resolution. Alternatively, the centro folded optical system may be mounted on the translation device and moved relative to the collector by a predetermined amount of less than pixel size in the focal plane of the optical system.

The EBAPS provides an increased gain by electron multiplication occurring when the electron beam scatters energy in a semiconductor. The EBAPS is normally used with a frontside illumination system to eliminate the need to passivate or otherwise cover and/or encapsulate the active pixel sensor chip. In addition, a photodiode is used (instead of a photogate) allowing the overlying materials to be removed from the photodiode semiconductor surface. The overlying materials may absorb the electrons and scatter the electron energy causing low EBAPS gain. Furthermore, the EBAPS frontside illumination system structure may include multiple glass-like sheets containing metallic wires placed on top of the pixel layer. These metallic wires connect the pixels to each other and link the pixels to other circuitry within the star camera system. In addition, the structure may include a color filter and a micro lens layer adhered to a back side of the silicon wafer.

Alternatively, the EBAPS may be applied to the backside illumination system wherein the sensor chip is shaved down to a thin layer. The back side of the silicon wafer (e.g., the side without glass-like sheets adhered) is shaved (e.g., etched or mechanically ground and/or polished) prior to adhering a color filter and a micro lens layer, to further expose the pixels. In certain circumstances, neither the color filter nor the micro lens is used. The color filter and the micro lens layers are then adhered to the shaved side of the silicon wafer, thereby allowing light to be captured directly onto the pixels without passing through and being blocked by the wired glass-like layers. Thus, the backside illumination system is capable of capturing light in low light environments such as from star light. This configuration reduces potential noise that may cause an image to appear grainy and reduces the need for boosting signals in low light since the light reaches the photocathode 315 more easily. However, in the present invention, light strikes the photocathode 315 directly, before reaching the sensor chip, and thus, potential noise may still be reduced without additional adjustments to the sensor chip.

Figure 5:
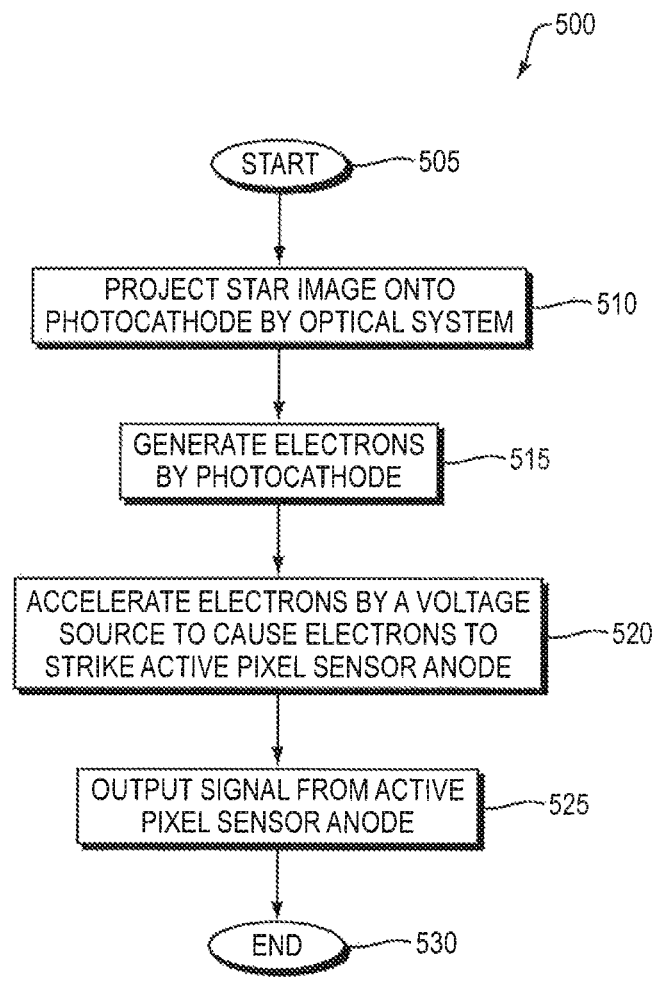
FIG. 5 illustrates a simplified procedure of capturing a star image for orientation measurement and celestial navigation according to exemplary embodiments of the present disclosure.

FIG. 5 illustrates an exemplary simplified procedure for capturing a star image for orientation measurement and celestial navigation according to an exemplary embodiment of the present invention described herein. The procedure 500 may start at step 505, and continues to step 510, where a star image is projected onto the photocathode 315 of an electron bombarded active pixel sensor disposed in a vacuum 320 by an optical system. Furthermore, in step 515, electrons are generated by the photocathode 315 when the photocathode 315 is exposed to the radiation from the star image. In step 520, the electrons are accelerated by a voltage source 330 that creates an electric field between the photocathode 315 and an active pixel sensor anode 325 disposed distant from the photocathode 315 in the vacuum 320, thereby causing the electrons to strike the active pixel sensor anode 325. Lastly, in step 525, a signal is output from the active pixel sensor anode 325 and the process may end illustratively in step 530.

In another embodiment, an ultraviolet sensitive electron bombarded active pixel sensor may be used to capture a star image. Specifically, a star image is projected by an optical system onto an ultraviolet sensitive photocathode 315 of an electron bombarded active pixel sensor disposed in a vacuum 320 in lieu of the visible light sensitive photocathode 315. Furthermore, electrons are generated by the ultraviolet sensitive photocathode 315 when exposed to the ultraviolet radiation from the star. The electrons are then accelerated by a voltage source 330 that creates an electric field between the ultraviolet sensitive photocathode 315 and an active pixel sensor anode 325 disposed distant from the photocathode 315 in the vacuum 320. A signal from the active pixel sensor anode 325 is then output. Moreover, the photocathode 315 may comprise a material such as gallium nitride to be sensitive to ultraviolet radiation from the star.

In some embodiments, the star camera system may capture star images using an imager sensitive to infrared radiation. In this embodiment, a star image is projected by an optical system onto an infrared sensitive photocathode 315 of an electron bombarded active pixel sensor disposed in a vacuum 320 in lieu of the visible light sensitive photocathode 315. Electrons are then generated by the infrared sensitive photocathode 315 when exposed to the infrared radiation from the star. Additionally, the electrons are accelerated by a voltage source 330 that creates an electric field between the infrared sensitive photocathode 315 and an active pixel sensor anode 325 disposed distant from the photocathode 315 in the vacuum 320. A signal from the active pixel sensor anode 325 is then output. Moreover, the photocathode 315 may comprise a material such as silicon germanium layer to be sensitive to the infrared radiation from the star.

Figure 4:
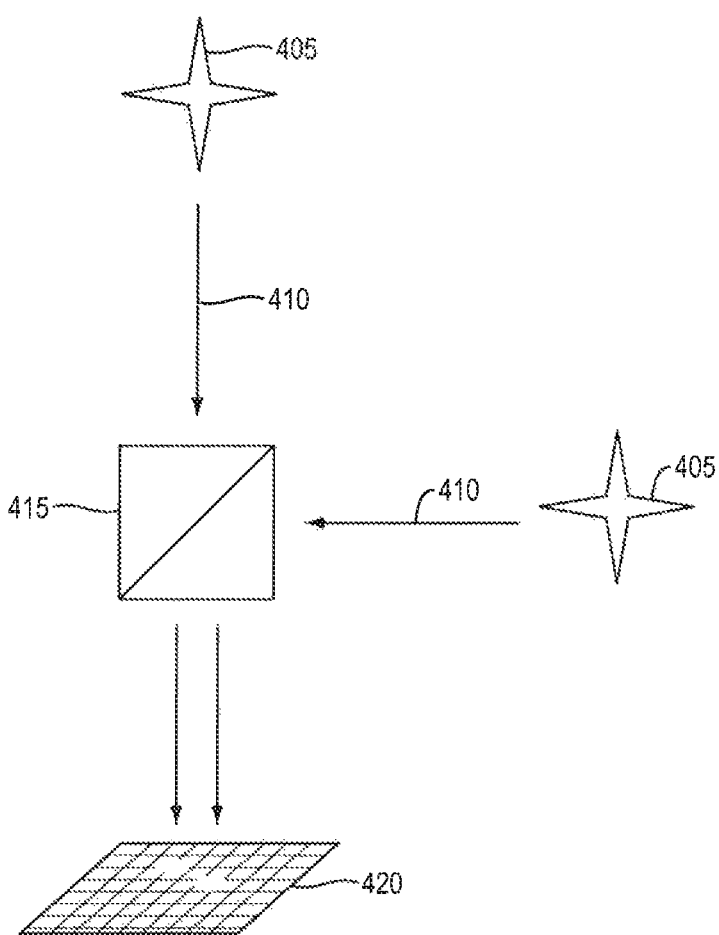
FIG. 4 illustrates an exemplary camera system capturing simultaneously two star images according to an exemplary embodiment of the present disclosure.

Alternatively, at least two star images 405 may be projected onto the electron bombarded active pixel sensor, and specifically projected onto the infrared sensitive photocathode 315 of the electron bombarded active pixel sensor. Thus, two star images 405 may simultaneously be captured by outputting a signal from the active pixel sensor anode 325 that corresponds to both projected star images 405. For example, as shown in FIG. 4, the radiation 410 of two distinct stars 405 may be simultaneously projected onto an optical system 415. The optical system 415 may combine and focus the radiation 410 onto a collector that includes an electron bombarded active pixel sensor 420. The electron bombarded active pixel sensor 420 includes a photocathode 315 that releases electrons when the radiation is focused thereon by the optical system 415. An electric field between the photocathode 315 and an active pixel sensor anode 325 directs the electrons to the active pixel sensor anode 325. The two stars 405 are therefore focused onto the electron bombarded active pixel sensor 420 in the same focal plane while remaining as separate electron images.

In yet another embodiment, the collector of the optical system may be moved to increase image resolution when the optical system is focused toward a star. Specifically, a star image 305 is projected onto a photocathode 315 by an optical system, wherein the photocathode 315 is disposed in a vacuum 320 distant from an active pixel sensor anode 325 of an electron bombarded pixel sensor (e.g., the collector). Furthermore, electrons are generated by the photocathode 315 when exposed to radiation from the star focused thereon by the optical system. In addition, the electrons are accelerated by a voltage source 330 created between the photocathode 315 and the active pixel sensor anode 325 to cause the electrons to strike the active pixel sensor anode 325. A first signal indicative of a first image is output from the active pixel sensor anode 325. Further, the collector having pixels of a predetermined size is moved within the focal plane of the optical system by an amount less than pixel size relative to the optical system using a translation device on which the collector is mounted. Then a second signal indicative of a second image is output from the active pixel sensor anode 325 and the first and the second signals are integrated to increase the resolution of the star image.

Alternatively, the optical system is moved in the focal plane of the collector using a translation device, on which the optical system is mounted, relative to the collector by a predetermined amount less than the pixel size. Furthermore, a second signal is output from the active pixel sensor anode 325 and the first and the second signals are integrated to increase the image resolution of the star.

The techniques herein provide a star camera system capable of capturing images of star observed in a variety of wavelengths. Moreover, the star camera system allows low light stars to be imaged to improve celestial navigation, orientation measurement, as well as guidance and navigation correction. In addition, the movement of the focal plane of the optical system may further improve image resolution of captured star images. Another advantage of the present disclosure is that the photons hit the photocathode 315 directly as opposed to the prior art wherein the phosphor screen is required to again generate photons from the accelerated electrons.

The foregoing description has been directed to specific embodiments. It will be apparent; however, that other variations and modifications may be made to the described embodiments, with the attainment of some or all of their advantages. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A star camera system, comprising:
an optical system configured to focus radiation from a star to be imaged onto a collector, the collector being in a form of an electron bombarded active pixel sensor configured to provide increased gain and being movable relative to a focal plane of the optical system, the collector including:
a photocathode disposed in a vacuum and configured to release electrons into a vacuum when exposed to radiation focused thereon by the optical system;
an active pixel sensor anode disposed separate from the photocathode in the vacuum; and
a voltage source configured to generate an electric field configured to direct the electrons from the photocathode to strike the active pixel sensor anode and generate an image of the star;
wherein movement of the collector, within the focal plane of the optical system, by an amount less than a pixel size of the collector results in generation of images having increased resolution.

2. The star camera system of claim 1, wherein:
the optical system is configured to focus ultraviolet radiation from the star to be imaged onto the collector,
the electron bombarded active pixel sensor is an ultraviolet sensitive electron bombarded active pixel sensor, including:
an ultraviolet sensitive photocathode, wherein the electric field is generated between the ultraviolet sensitive photocathode and the active pixel sensor anode.

3. The star camera system of claim 2, wherein the ultraviolet sensitive photocathode comprises gallium nitride.

4. The star camera system of claim 1, wherein:
the optical system is configured to focus infrared radiation from the star to be imaged onto the collector,
the photocathode is an infrared sensitive photocathode, and
the electric field is generated between the infrared sensitive photocathode and the active pixel sensor anode.

5. The star camera system of claim 4, wherein the electron bombarded active pixel sensor comprises a silicon germanium layer.

6. A method of capturing a star image for celestial navigation, orientation, position and attitude measurement, and solution correction, the method comprising:
in an optical system configured to focus radiation from a star to be imaged onto a collector in a form of an electron bombarded active pixel sensor:
projecting a star image onto a photocathode of the electron bombarded active pixel sensor disposed in a vacuum to release electrons in the vacuum;
positioning an active pixel sensor anode of the electron bombarded active pixel sensor separate from the photocathode in the vacuum;
outputting a signal from the active pixel sensor anode; and
generating images of high resolution by moving the collector, within a focal plane of the optical system, by an amount less than a pixel size of the collector to obtain multiple images of the star at various location.

7. The method of claim 6, further comprising:
generating a voltage between the photocathode and the anode to direct the electrons from the photocathode to the anode, prior to outputting the signal from the active pixel sensor anode.

8. The method of claim 6, wherein the photocathode is an ultraviolet sensitive photocathode.

9. The method of claim 8, wherein the ultraviolet sensitive photocathode comprises gallium nitride.

10. The method of claim 6, wherein:
the optical system is configured to focus infrared radiation from the star to be imaged onto the collector,
the photocathode is an infrared sensitive photocathode, and
the electric field is generated between the infrared sensitive photocathode and the active pixel sensor anode.

11. The star camera system of claim 10, wherein the electron bombarded active pixel sensor comprises a silicon germanium layer.

12. A star camera system, comprising:
an optical system configured to focus infrared radiation from at least two stars onto a collector the collector in a form of an electron bombarded active pixel sensor configured to detect the radiation from the at least two stars focused thereon by the optical system and including:
an infrared sensitive photocathode disposed in a vacuum and configured to release electrons into the vacuum when exposed to infrared radiation focused thereon by the optical system;
an active pixel sensor anode disposed separate from the infrared sensitive photocathode in the vacuum;
a voltage source to generate an electric field between the infrared sensitive photocathode and the active pixel sensor anode configured to direct the electrons from the infrared sensitive photocathode to the active pixel sensor anode, thereby forming an electron image of the two stars on the active pixel sensor anode; and
a translation device to move the collector, within the focal plane of the optical system, by an amount less than a pixel size of the collector results in generation of images having increased resolution.

13. The star camera of claim 12, wherein the electron bombarded active pixel sensor comprises a silicon germanium layer.

14. A method of capturing a star image for celestial navigation, comprising:
projecting at least two star images onto a collector in a form of an electron bombarded active pixel sensor, including:
an infrared sensitive photocathode in a vacuum configured to release electrons in the vacuum when exposed to infrared radiation focused thereon by an optical system;
an active pixel sensor anode separate from the infrared sensitive photocathode in the vacuum;
a voltage source to direct electrons from the infrared sensitive photocathode to the active pixel sensor anode;
outputting a signal from the active pixel sensor anode; and
generating images of high resolution by moving the collector, within a focal plane of the optical system, by an amount less than a pixel size of the collector to obtain multiple images of the star at various location.

15. The method of claim 14, wherein the electron bombarded active pixel sensor comprises a silicon germanium layer.

* * * * *